United States Patent
Lee

(10) Patent No.: US 6,422,106 B1
(45) Date of Patent: Jul. 23, 2002

(54) SHIFT SWITCH CONTROL DEVICE FOR SELECTION LEVER UNITS OF AUTOMATIC TRANSMISSIONS

(75) Inventor: Sang-Joo Lee, Kyungki-Do (KR)

(73) Assignee: Hyundai Motor Company, Seoul (KR)

( * ) Notice: Subject to any disclaimer, the term of this patent is extended or adjusted under 35 U.S.C. 154(b) by 19 days.

(21) Appl. No.: 09/739,808

(22) Filed: Dec. 20, 2000

(30) Foreign Application Priority Data

Sep. 4, 2000 (KR) .......................................... 2000-52018

(51) Int. Cl.[7] .............................................. B60K 20/00
(52) U.S. Cl. .................................................. 74/473.18
(58) Field of Search ........................ 74/473.26, 473.24, 74/473.25, 473.18

(56) References Cited

U.S. PATENT DOCUMENTS

| | | | | |
|---|---|---|---|---|
| 5,044,220 A | * | 9/1991 | Raff et al. ................ | 74/473.18 |
| 5,845,535 A | * | 12/1998 | Wakabayashi et al. ... | 74/473.18 |
| 5,946,976 A | * | 9/1999 | Miyoshi et al. .......... | 74/473.18 |

* cited by examiner

*Primary Examiner*—Paul N. Dickson
*Assistant Examiner*—Melanie Torres
(74) *Attorney, Agent, or Firm*—Birch, Stewart, Kolasch & Birch, LLP

(57) ABSTRACT

A shift switch control device for selection lever units of automatic transmissions is disclosed. The shift switch control device has a selection lever for selecting a desired range within a transmission pattern during the automatic transmission mode and performing an up- or down-shifting operation during the manual transmission mode. A rotary lever, having a key hole, is positioned in the gap between the up- and down-shift switches, while a locking key is inserted into the key slot so as to lock the rotary lever to the selection lever at the M-stage of the manual transmission mode. A key actuation rod is set within the casing of the selection lever such that it rotates the locking key to the outside or inside of the casing of the selection lever. In the shift switch control device, the actuated direction of the actuation buttons of the two shift switches is equal to that of the rotary lever, thus accomplishing a desired operational reliability of the shift switch control device during a manual transmission mode. The control device is also reduced in the number of its parts, thus being preferably simplified in its construction and being easily manufactured at a low production cost, and being easily installed within a limited area.

7 Claims, 6 Drawing Sheets

SHIFT SWITCH CONTROL DEVICE FOR SELECTION LEVER UNITS OF AUTOMATIC TRANSMISSIONS

BACKGROUND OF THE INVENTION

1. Field of the Invention

The present invention relates to a shift switch control device for selection lever units of automatic transmissions and, more particularly, to a shift switch control device for selection lever units of sport mode-type automatic transmissions capable of selectively performing an automatic transmission mode or a manual transmission mode as desired, the shift switch control device designed to accomplish a reliable up-shift operation, so-called a "+" shift operation, and a reliable down-shift operation, so-called a "−" shift operation, during a manual transmission mode, and to be reduced in the number of its parts, thus being preferably simplified in its construction.

2. Description of the Prior Art

In recent years, sport mode-type automatic transmissions, designed to allow drivers to select an automatic transmission mode or a manual transmission mode as desired in accordance with driving conditions and/or driver's tastes while driving, have been developed and proposed to be equipped within, particularly, a variety of expensive luxury cars.

Different from conventional transmissions with a fixed automatic transmission mode or a fixed manual transmission mode, such sport mode-type automatic transmissions allow drivers to enjoy the driving feeling to the full while selecting the automatic transmission mode or the manual transmission mode as desired in accordance with driving conditions and/or their tastes while driving their cars.

Such a sport mode-type automatic transmission is provided with a selection lever unit for allowing a driver to perform a desired shifting operation. The construction of a conventional selection lever unit for such sport mode-type automatic transmissions is shown in FIGS. 7, 8 and 9. As shown in the drawings, the conventional selection lever unit has a selection lever 100, which is installed within a main frame 111 and is used for selecting a desired mode or a desired range within a transmission pattern 110 having a manual transmission mode and an automatic transmission mode. A cable bracket 113 is connected to a shift cable (not shown) at a position around the selection lever 100. The above cable bracket 113 is operated in conjunction with the selection lever 100 when the automatic transmission mode is selected, thus actuating a transmission manual valve (not shown).

The selection lever 100 has two connection protrusions 114, while the cable bracket 113 has a connection lever 115 at a position corresponding to the connection protrusions 114. Therefore, the selection lever 100 is operated in conjunction with the cable bracket 113 through the engagement of the two connection protrusions 114 and 114' with the connection lever 115 during an automatic transmission mode.

The conventional selection lever unit has a shift switch control device of FIG. 9. As shown in the drawing, the conventional shift switch control device for selection lever units comprises a manual mode select switch 103, an up-shift switch 101, a down-shift switch 102 and a switch actuation unit, which are provided on the top wall of the main frame 111. The up-shift switch 101 and the down-shift switch 102 are used for performing the up- and down-shifting operations when the manual transmission mode is selected by the selection lever 100.

In such a case, the up-shift switch 101 is positioned at the front portion of the shift switch control device, while the down-shift switch 102 is positioned at the rear portion of the control device. In addition, the manual mode select switch 103 is positioned between the up-shift switch 101 and the down-shift switch 102.

Two shift switch actuation members 104 and 105 are provided at positions corresponding to the up-shift switch 101 and the down-shift switch 102, with a gap defined between the two shift switch actuation members 104 and 105. When the manual transmission mode is selected by the selection lever 100, the lever 100 is inserted into the gap defined between the two shift switch actuation members 104 and 105 while pushing and turning on the manual mode select switch 103.

In each of the two shift switch actuation members 104 and 105, a tipping bar 108 is set within a housing 106 while being normally biased by a return spring 107 at its rear end, thus normally positioning the selection lever 100 at a neutral position.

Therefore, when the selection lever 100 is moved to perform a desired shifting operation, the tipping bars 108 of the two shift switch actuation members 104 and 105 actuate the up and down-shift switches 101 and 102, thus allowing the switches 101 and 102 to output up- and down-shifting signals.

In such a case, the manual mode select switch 103 is continuously operated by a side surface of the selection lever 100, thus being maintained at its activated state.

However, such a conventional shift switch control device for selection lever units of automatic transmissions is problematic in that it is very difficult to maintain the precise actuation gaps between the tipping bars 108 and the up- and down-shift switches 101 and 102. In addition, the operational direction of the tipping bars 108 is different from the operational direction of the up- and down-shift switches 101 and 102. Therefore, the shift switch control device may fail to accomplish a desired operational reliability.

In addition, it is very difficult to manufacture the tipping bars, and so the tipping bars are very expensive. Another problem experienced in the conventional shift switch control device resides in that it has a complex construction and is not easy to install within a limited area.

SUMMARY OF THE INVENTION

Accordingly, the present invention has been made keeping in mind the above problems occurring in the prior art, and an object of the present invention is to provide a shift switch control device for selection lever units of automatic transmissions capable of selectively performing an automatic transmission mode or a manual transmission mode as desired, which is designed to accomplish a reliable up-shift operation, so-called a "+". shift operation, and a reliable down-shift operation, so-called a "−" shift operation, during a manual transmission mode, and which is reduced in the number of its parts, thus being preferably simplified in its construction.

In order to accomplish the above object, the present invention provides a shift switch control device for selection lever units of automatic transmissions, comprising: a selection lever installed within a main frame of a chassis by a hinge shaft and used for selecting a desired range within a transmission pattern during an automatic transmission mode and performing an up- or down-shifting operation during a manual transmission mode, the transmission pattern having an automatic transmission mode pattern and a manual transmission mode pattern, the selection lever turning on or off up- and down-shift switches during the manual transmission mode, thus performing the up- or down-shifting operation, the up- and down-shift switches being mounted to the chassis by brackets such that the up- and down-shift switches are symmetrical along a central axis of a M-stage of the manual transmission mode pattern; a rotary lever mounted to the hinge shaft at its lower end at one side of the selection lever such that the top portion of the rotary lever is positioned in a gap between the up- and down-shift switches, with a key slot formed at the central portion of the rotary lever at a surface facing the selection lever; a rotary lever return means provided at the lower end of the rotary lever for providing a forward and backward returning force to the rotary lever; a locking key hinged within a casing of the selection lever such that the locking key is rotatable to pass through a connection hole of the casing so as to be finally inserted into the key slot of the rotary lever, thus locking the rotary lever to the selection lever at the M-stage of the manual transmission mode pattern, the locking key being normally biased by a key return spring in a direction such that the locking key is inserted into the key slot of the rotary lever; and a key actuation rod set within the casing of the selection lever, with a keyhole having a size corresponding to the radius of actuation of the locking key and formed at one sidewall of the key actuation rod, and a knob mounted to a top end of the key actuation rod and provided with a push button, the key actuation rod being operated in conjunction with both the push button and the key return spring, thus rotating the locking key to the outside or inside of the casing of the selection lever.

In the above shift switch control device, the M-stage of the manual transmission mode pattern has a plus (+) stage for actuating the up-shift switch and a minus (–) stage for actuating the down-shift switch.

The rotary lever return means comprises: front and rear support brackets mounted to the chassis at positions in front and back of the rotary lever; and a return spring positioned between the rotary lever and each of the front and rear support brackets.

In addition, the key return spring is mounted to the hinge shaft of the locking key, with opposite ends of the key return spring supported by a pin of the locking key and a pin of the casing of the selection lever.

The keyhole of the key actuation rod has a key inlet opening at one side thereof, thus allowing the locking key to be inserted into the keyhole after passing through the key inlet opening, with a key actuation pin provided at a top edge of the key inlet opening for pushing the locking key into the casing of the selection lever when the key actuation rod is moved downward.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
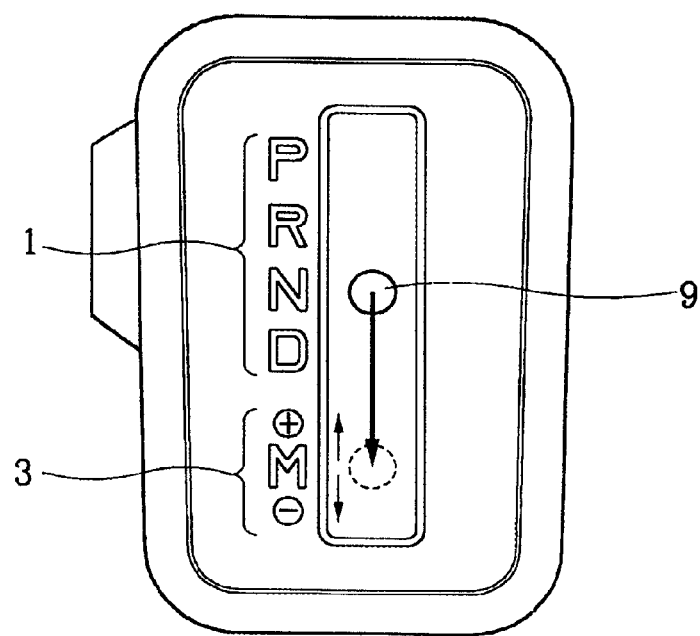
FIG. 1 is a view, showing the transmission pattern of a selection lever unit of automatic transmissions capable of selectively performing an automatic transmission mode or a manual transmission mode as desired in accordance with the preferred embodiment of the present invention.
Figure 2:
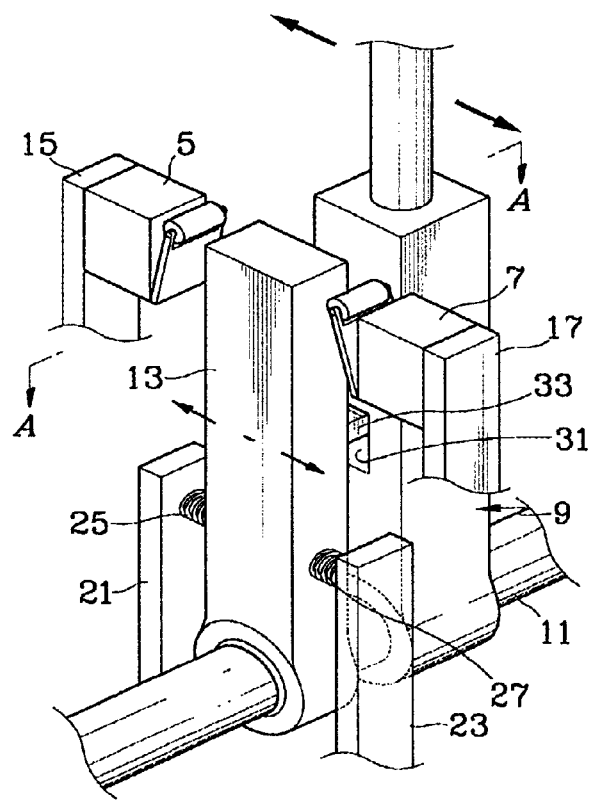
FIG. 2 is a perspective view of a shift switch control device for selection lever units of automatic transmissions in accordance with the present invention.

FIG. 1 is a view, showing the transmission pattern of a selection lever unit of automatic transmissions capable of selectively performing an automatic transmission mode or a manual transmission mode as desired in accordance with the preferred embodiment of the present invention. FIG. 2 is a perspective view of a shift switch control device for selection lever units of automatic transmissions in accordance with the present invention. As shown in the drawings, the transmission pattern of a selection lever unit of automatic transmissions of this invention has an automatic transmission mode pattern 1 comprising a plurality of stages, that is, P, R, N and D-stages arranged in a line, and a manual transmission mode pattern 3 comprising an M-stage. The manual transmission mode pattern 3 is arranged in back of the automatic transmission mode pattern 1.

The M-stage of the manual transmission mode pattern 3 has a plus (+) stage for actuating an up-shift switch 5 and a minus (–) stage for actuating a down-shift switch 7.

As shown in FIG. 2, the shift switch control device for selection lever units of automatic transmissions in accordance with the present invention has a selection lever 9, which is mounted to a hinge shaft 11 so as to be moved between the automatic transmission mode pattern 1 and the manual transmission mode pattern 3 in accordance with a selected transmission mode. The above selection lever 9 turns on or off the up- or down-shift switch 5 or 7 by a rotary lever 13 during the manual transmission mode, thus performing the up- or down-shifting operation.

That is, the up and down-shift switches 5 and 7 are mounted to the chassis (not shown) by brackets 15 and 17 such that the up- and down-shift switches 5 and 7 are symmetrical along the central axis of the M-stage. The lower end of the rotary lever 13 is mounted to the hinge shaft 11 at one side of the selection lever 9. The top portion of the rotary lever 13 is positioned in the gap between the up- and down-shift switches 5 and 7, with a key slot 19 formed at the central portion of the lever 13 at a surface facing the selection lever 9 as shown in FIG. 3.

A return means is provided at the lower end of the rotary lever 13 for providing a forward and backward returning force to the lever 13. This return means comprises front and rear support brackets 21 and 23 mounted to the chassis (not shown), with a return spring 25 or 27 positioned between the rotary lever 13 and each of the support brackets 21 and 23.

Figure 3:
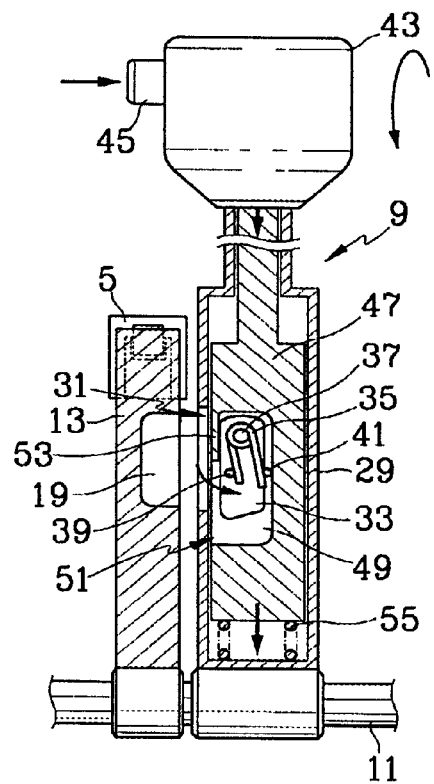
FIG. 3 is a sectional view taken along the line A—A of FIG. 2, showing an operation of a rotary pin when the shift switch control device for selection lever units of automatic transmissions of this invention shifts the transmission mode from an automatic mode (D-stage) to a manual mode (M-stage)

As shown in FIG. 3, a locking key 33 is hinged within a casing 29 of the selection lever 9. This locking key 33 is rotated to pass through a connection hole 31 of the casing 29 so as to be finally inserted into the key slot 19 of the lever 13, thus locking the rotary lever 13 to the selection lever 9 at the M-stage of the manual transmission mode pattern 3.

A key return spring 35 is mounted to the hinge shaft 37 of the locking key 33. One end of the key return spring 35 is supported by a pin 39 of the locking key 33, while the other end of the spring 35 is supported by a pin 41 of the casing 29, thus normally biasing the locking key 33 in a direction such that the key 33 is inserted into the key slot 19 of the rotary lever 13.

A key actuation rod 47 is set within the casing 29 of the selection lever 9 while being normally biased upward by a coil spring 55 at its lower end. A knob 43 is mounted to the top end of the key actuation rod 47, with a push button 45 provided at the sidewall of the knob 43. The above key actuation rod 47 is operated in conjunction with both the push button 45 and the key return spring 35, thus rotating the locking key 33 to the outside or inside of the casing 29. A keyhole 49, having a size corresponding to the radius of actuation of the locking key 33, is formed at the sidewall of the key actuation rod 47. The keyhole 49 has a key inlet opening 51, and so it is possible for the locking key 33 to be inserted into the keyhole 49 after passing through the opening 51. A key actuation pin 53 is provided at the top edge of the opening 51 for pushing the locking key 33 into the casing 29 when the key actuation rod 47 is moved downward.

The operation of the above shift switch control device of this invention will be described herein below with reference to FIGS. 4, 5 and 6.

Figure 4:
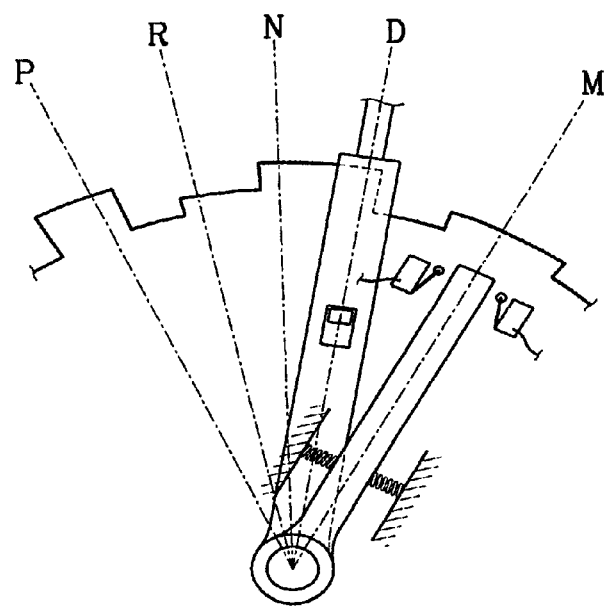
FIG. 4 is a view, showing an operation of the shift switch control device for selection lever units of automatic transmissions of this invention during the automatic transmission mode (D-stage)

In FIG. 4, the selection lever 9 is positioned at the D-stage of the automatic transmission mode pattern 1, while the rotary lever 13 is positioned at the M-stage of the manual transmission mode pattern 3. In addition, the locking key 33 within the casing 29 of the selection lever 9 is projected to the outside of the casing 29 by the key return spring 35 as shown in FIG. 6.

In such a case, the rotary lever 13 is elastically supported by the two return springs 25 and 27 so as to be regularly spaced apart from the up- and down-shift switches 5 and 7 at its top end at the same interval.

Figure 5:
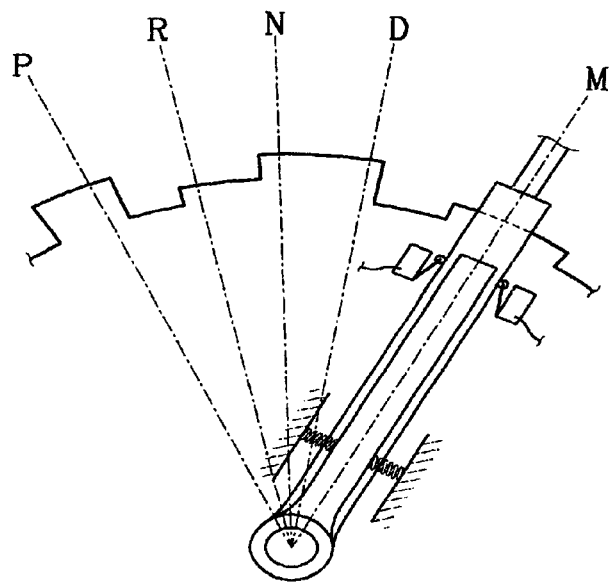
FIG. 5 is a view, showing an operation of the shift switch control device for selection lever units of automatic transmissions of this invention during the manual transmission mode (M-stage)
Figure 6:
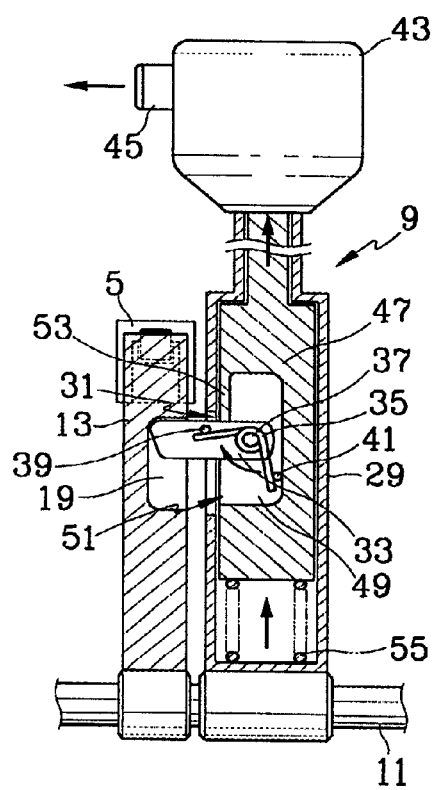
FIG. 6 is a sectional view taken along the line A—A of FIG. 2, showing an operation of the rotary pin when the shift switch control device for selection lever units of automatic transmissions of this invention selects the manual transmission mode (M-stage)
Figure 7:
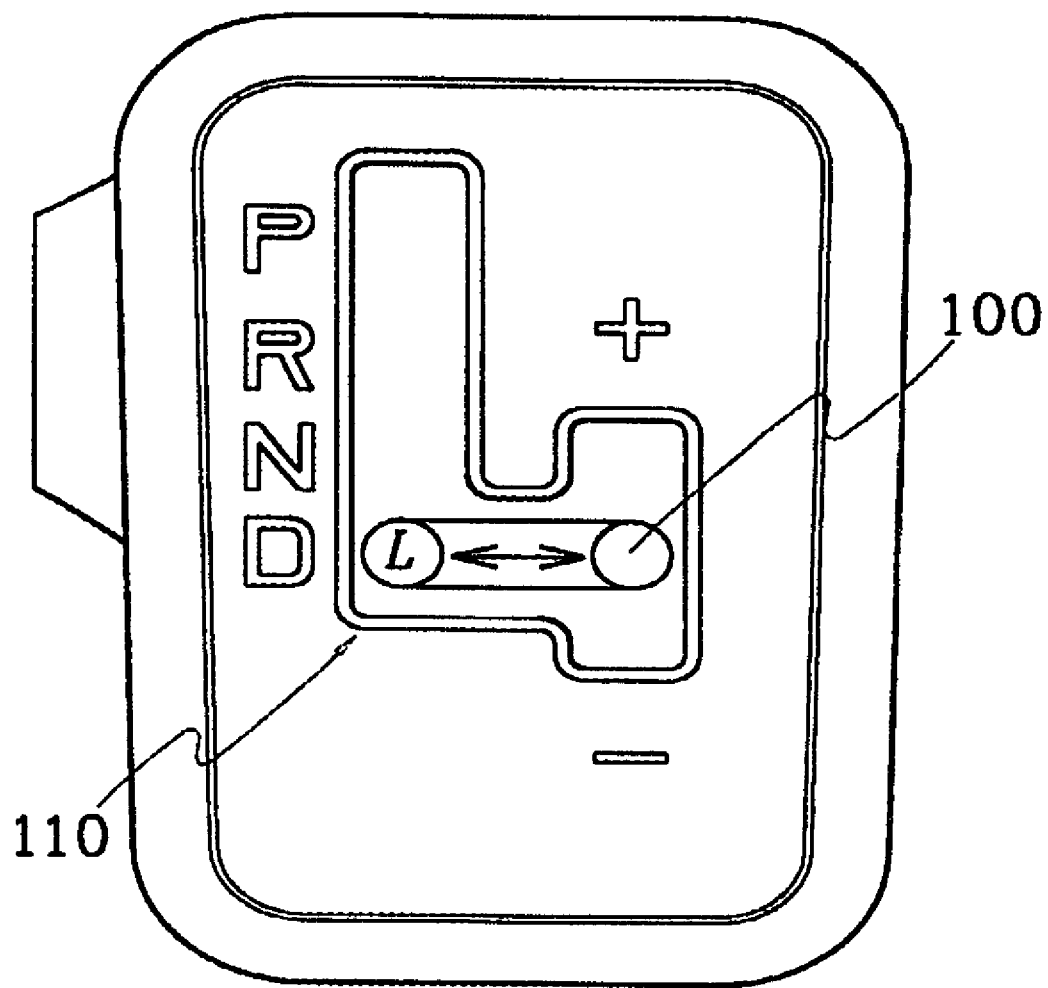
FIG. 7 is a view, showing the transmission pattern of a conventional selection lever unit of automatic transmissions capable of selectively performing an automatic transmission mode or a manual transmission mode as desired.
Figure 8:
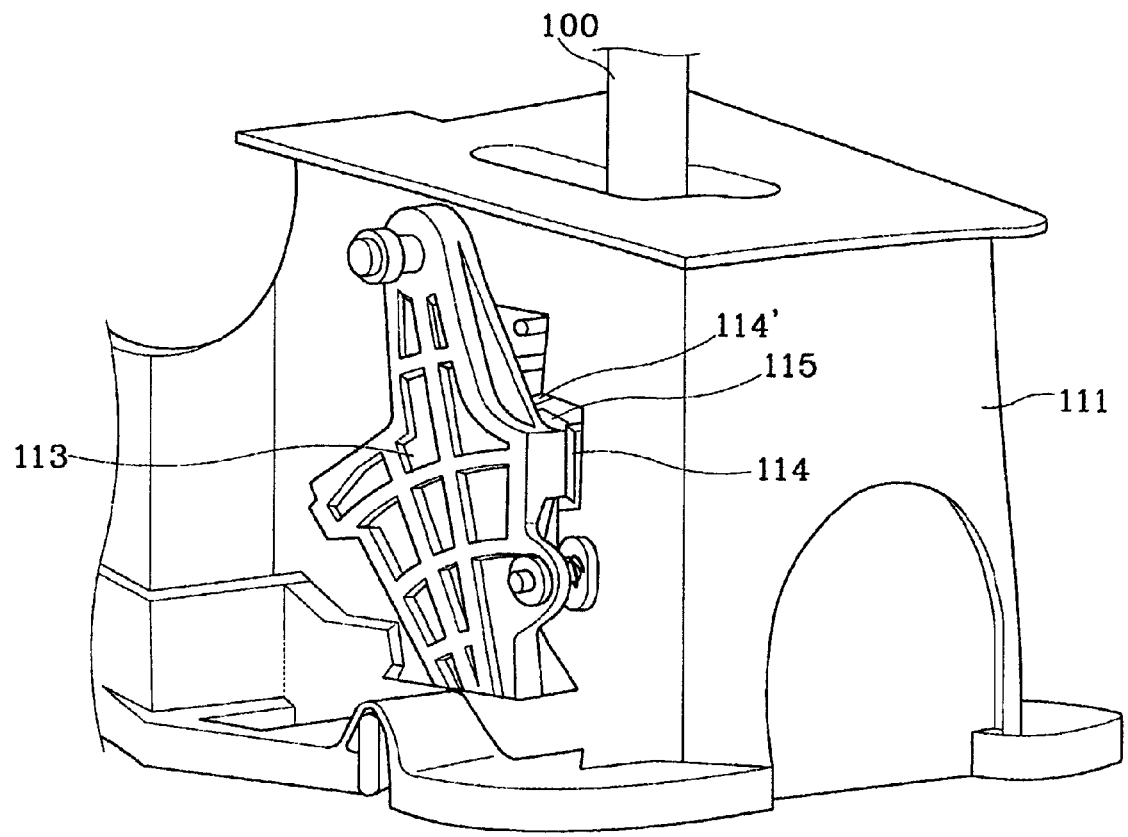
FIG. 8 is a perspective view, showing the construction of the conventional selection lever unit of automatic transmissions.
Figure 9:
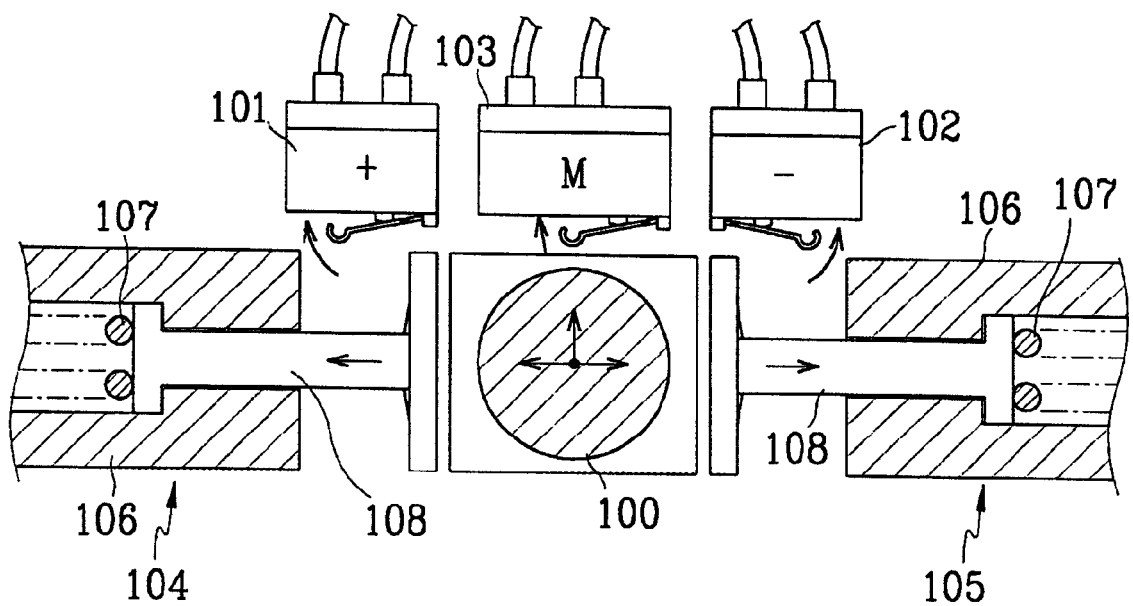
FIG. 9 is a plan sectional view, showing the construction of a conventional shift switch control device for selection lever units of automatic transmissions.

In order to move the selection lever 9 from the D-stage of the automatic transmission mode pattern 1 to the M-stage of the manual transmission mode pattern 3 as shown in FIG. 5, the push button 45 of the knob 43 of the selection lever 9 is pushed to allow the locking key 33 to be rotated into the casing 29 of the selection lever 9 as shown in FIG. 3 prior to moving the lever 9 to the M-stage of the manual transmission mode pattern 3.

When the selection lever 9 is completely moved to the M-stage of the manual transmission mode pattern 3 as described above, the push button 45 is released. In such a case, the key actuation rod 47 is elastically returned upward by the restoring force of the coil spring 55. Therefore, the key actuation pin 53 is removed from the locking key 33, and so the rotating force of the key return spring 35 acts on the rotary lever 13. The locking key 33 is thus rotated to be inserted into the key slot 19, thus locking the rotary lever 13 to the selection lever 9.

When the selection lever 9 in the above state is moved forward, the lever 9 turns on the actuation button of the up-shift switch 5, thus performing a desired up-shifting operation. On the other hand, when the selection lever 9 is moved backward, the lever 9 turns on the actuation button of the down-shift switch 7, thus performing a desired down-shifting operation.

In addition, the transmission mode shifting operation for shifting the mode from the M-stage to the D-stage is accomplished by reversely performing the above-mentioned transmission mode shifting operation for shifting the mode from the D-stage to the M-stage, and further explanation is thus not deemed necessary.

As described above, the present invention provides a shift switch control device for selection lever units of automatic transmissions capable of selectively performing an automatic transmission mode or a manual transmission mode as desired. In the shift switch control device, the actuated direction of the actuation buttons of the up- and down-shift switches is equal to that of the rotary lever practically actuating the up- and down-shift switches, thus accomplishing a desired operational reliability of the shift switch control device during a manual transmission mode. The shift switch control device of this invention is also reduced in the number of its parts, thus being preferably simplified in its construction. The shift switch control device is thus easily manufactured at a low production cost, and is easily installed within a limited area.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A shift switch control device for selection lever units of automatic transmissions, comprising:

a selection lever installed within a main frame of a chassis by a hinge shaft and used for selecting a desired range within a transmission pattern during an automatic transmission mode and performing an up- or down-shifting operation during a manual transmission mode, said transmission pattern having an automatic transmission mode pattern and a manual transmission mode pattern, said selection lever turning on or off up- and down-shift switches during the manual transmission mode, thus performing the up or down-shifting operation, said up- and down-shift switches being mounted to the chassis by brackets such that the up- and down-shift switches are symmetrical along a central axis of a M-stage of the manual transmission mode pattern;

a rotary lever mounted to said hinge shaft at its lower end at one side of said selection lever such that a top portion of said rotary lever is positioned in a gap between the up- and down-shift switches, with a key slot formed at a central portion of said rotary lever at a surface facing said selection lever;

rotary lever return means provided at the lower end of said rotary lever for providing a forward and backward returning force to said rotary lever;

a locking key hinged within a casing of said selection lever such that the locking key is rotatable to pass through a connection hole of said casing so as to be finally inserted into said key slot of the rotary lever, thus locking said rotary lever to said selection lever at the M-stage of the manual transmission mode pattern, said locking key being normally biased by a key return spring in a direction such that the locking key is inserted into said key slot of the rotary lever; and a key actuation rod set within the casing of said selection lever, with a keyhole having a size corresponding to a radius of actuation of said locking key and formed at one sidewall of said key actuation rod, and a knob mounted to a top end of said key actuation rod and provided with a push button, said key actuation rod being operated in conjunction with both said push button and said key return spring, thus rotating said locking key to the outside or inside of said casing of the selection lever.

2. The shift switch control device according to claim 1, wherein said automatic transmission mode pattern comprising P, R, N and D-stages arranged in a line.

3. The shift switch control device according to claim 1, wherein said M-stage of manual transmission mode pattern being arranged in back of said automatic transmission mode pattern.

4. The shift switch control device according to claim 3, wherein said M-stage of the manual transmission mode pattern has a plus (+) stage for actuating said up-shift switch and a minus (−) stage for actuating said down-shift switch.

5. The shift switch control device according to claim 1, wherein said rotary lever return means comprises:

front and rear support brackets mounted to said chassis at positions in front and back of said rotary lever; and a return spring positioned between said rotary lever and each of said front and rear support brackets.

6. The shift switch control device according to claim 1, wherein said key return spring is mounted to said hinge shaft of the locking key, with opposite ends of said key return spring supported by a pin of said locking key and a pin of said casing of the selection lever.

7. The shift switch control device according to claim 1, wherein said keyhole of the key actuation rod has a key inlet opening at one side thereof, thus allowing the locking key to be inserted into said keyhole after passing through the key inlet opening, with a key actuation pin provided at a top edge of said key inlet opening for pushing the locking key into the casing of the selection lever when the key actuation rod is moved downward.

\* \* \* \* \*